United States Patent [19]
Fujimoto et al.

[11] Patent Number: 5,635,786
[45] Date of Patent: Jun. 3, 1997

[54] VIBRATING GYROSCOPE

[75] Inventors: Katsumi Fujimoto, Toyama-ken; Takeshi Nakamura, Uji; Kazuhiro Ebara, Toyama; Nobuyuki Ishitoko, Toyama-ken, all of Japan

[73] Assignee: Murata Manufacturing Co., Ltd., Kyoto-fu, Japan

[21] Appl. No.: 455,717

[22] Filed: May 31, 1995

[30] Foreign Application Priority Data

Jun. 3, 1994 [JP] Japan ................... 6-145527

[51] Int. Cl.$^6$ ................... H01L 41/08
[52] U.S. Cl. ................... 310/316; 310/329; 310/332; 310/366; 73/504.12
[58] Field of Search ................... 310/316, 317, 310/319, 321, 329–332, 358, 366; 73/505

[56] References Cited

U.S. PATENT DOCUMENTS

| | | | |
|---|---|---|---|
| 4,431,935 | 2/1984 | Rider | 310/331 |
| 5,248,912 | 9/1993 | Zdeblick et al. | 310/332 |
| 5,430,342 | 7/1995 | Watson | 310/316 |

*Primary Examiner*—Mark O. Budd
*Attorney, Agent, or Firm*—Nikaido, Marmelstein, Murray & Oram LLP

[57] ABSTRACT

A vibrating gyroscope 10 includes a regular quadrangular prism-shaped vibrator 12. The vibrator 12 includes, a first piezoelectric base plate 14a and a second piezoelectric base plate 14b, which are polarized reversely each other in a direction of thickness. On a main surface of the first piezoelectric base plate 14a, two divided electrodes 16, 16 are formed in laterally spaced relationship. On a main surface of the second piezoelectric base plate 14b, a common electrode 18 is formed. Between the first piezoelectric base plate 14a and the second piezoelectric base plate 14b, a dummy electrode 20 is formed. One output terminal of an oscillation circuit 30 as a driving means is connected to the two divided electrodes 16, 16 of the vibrator 12, via resistors 32a and 32b. Another output terminal of the oscillation circuit 30 is connected to the common electrode 18 of the vibrator 12. The two divided electrodes 16, 16 of the vibrator 12 are respectively connected to a non-inverting input terminal and an inverting input terminal of a differential amplifier circuit 36 as a detecting means, via resistors 34a and 34b.

10 Claims, 9 Drawing Sheets

VIBRATING GYROSCOPE

BACKGROUND OF THE INVENTION

1. Field of the Invention

The present invention relates to a vibrating gyroscope, and, more particularly, to a vibrating gyroscope that is applied to a navigation system which detects a position of a mobile by detecting its rotational angular velocity and guides it properly, a system for damping a vibration such as a device for protecting an unsteady hold which detects a rotational angular velocity due to an external vibration such as a hand vibration and damps it properly, or the like.

2. Description of the Prior Art

FIG. 15 is an illustrative view showing an example of a conventional vibrating gyroscope. The vibrating gyroscope 1 includes a vibrator 2.

The vibrator 2 includes a regular triangular prism-shaped vibrating body 3 consisting of a Ni alloy, and on substantially center portions of three side faces of the vibrating body 3, three piezoelectric elements 4a, 4b and 4c are formed, respectively. In the vibrator 2, when similar driving signals are applied to, for example, the piezoelectric elements 4a and 4b, the vibrating body 3 bends and vibrates in a direction perpendicular to a main surface of the piezoelectric element 4c. When no-rotation, similar detecting signals are obtained from the piezoelectric elements 4a and 4b. When a rotational angular velocity is applied to the vibrator 2 about a center axis of the vibrating body 3, the bending and vibrating direction of the vibrating body 3 is changed by a Coriolis force, and detecting signals corresponding to the rotational angular velocity are obtained from the two piezoelectric elements 4a and 4b, respectively. In this case, corresponding to the rotational angular velocity, for example, a voltage of the detecting signal from one piezoelectric element 4a becomes larger, and a voltage of the detecting signal from the other piezoelectric element 4b becomes smaller.

The piezoelectric element 4c of the vibrator 2 is connected to an input terminal of an oscillation circuit 5 consisting of, for example, an amplifier. An output terminal of the oscillation circuit 5 is connected to ends of two resistors 6a and 6b, and the other ends of the resistors 6a and 6b are connected to the piezoelectric elements 4a and 4b, respectively. The piezoelectric elements 4a and 4b are connected to a non-inverting input terminal and an inverting input terminal of a differential amplifier circuit 7, respectively.

Accordingly, in the vibrating gyroscope 1, by an output signal from the differential amplifier circuit 7, it can be detected that a rotational angular velocity is not applied thereto, or a rotational angular velocity applied thereto can be detected.

However, in the vibrating gyroscope 1, since an expensive Ni alloy is used in the vibrating body 3 of the vibrator 2, it is problematic in that the cost becomes high and the signal being detected is affected by a magnetic field and becomes disorder.

SUMMARY OF THE INVENTION

Therefore, it is a primary object of the present invention to provide a vibrating gyroscope wherein the cost can be decreased and a signal being detected is hardly affected by a magnetic field.

A vibrating gyroscope according to the present invention present comprises a first piezoelectric base plate polarized in a direction of thickness, a second piezoelectric base plate laminated on the first piezoelectric base plate, and polarized in a reverse direction of the polarizing direction of the first piezoelectric base plate, two divided electrodes formed on a main surface of the first piezoelectric base plate, a common electrode formed on a main surface of the second piezoelectric base plate, a driving means for applying a driving signal between the two divided electrodes and the common electrode, and a detecting means for detecting a signal generated between the two divided electrodes. In the vibrating gyroscope, for example, the driving means includes an oscillation circuit whose one output terminal is connected to the two divided electrodes, and another output terminal is connected to the common electrode, and the detecting means includes a differential amplifier circuit whose two input terminals are respectively connected to the two divided electrodes.

Another vibrating gyroscope according to the present invention comprises a first piezoelectric base plate polarized in a direction of thickness, a second piezoelectric base plate laminated on the first piezoelectric base plate, and polarized in a reverse direction of the polarizing direction of the first piezoelectric base plate, two divided electrodes formed between the first piezoelectric base plate and the second piezoelectric base plate, a first common electrode formed on a main surface of the first piezoelectric base plate, a second common electrode formed on a main surface of the second piezoelectric base plate, a driving means for applying a driving signal between the first common electrode and the second common electrode, and a detecting means for detecting a signal generated between the two divided electrodes. In the vibrating gyroscope, for example, the driving means includes an oscillation circuit whose one output terminal is connected to the first common electrode, and another output terminal is connected to the second common electrode, and the detecting means includes a differential amplifier circuit whose two input terminals are respectively connected to the two divided electrodes.

Still another vibrating gyroscope according to the present invention comprises a first piezoelectric base plate polarized in a direction of thickness, a second piezoelectric base plate laminated on the first piezoelectric base plate, and polarized in the same direction as the polarizing direction of the first piezoelectric base plate, two divided electrodes formed between the first piezoelectric base plate and the second piezoelectric base plate, a first common electrode formed on a main surface of the first piezoelectric base plate, a second common electrode formed on a main surface of the second piezoelectric base plate, a driving means for applying a driving signal between the two divided electrodes, the first common electrode and the second common electrode, and a detecting means for detecting a signal generated between the two divided electrodes. In the vibrating gyroscope, for example, the driving means includes an oscillation circuit whose one output terminal is connected to the two divided electrodes, and another output terminal is connected to the first common electrode and the second common electrode, and the detecting means includes a differential amplifier circuit whose two input terminals are respectively connected to the two divided electrodes.

A separate vibrating gyroscope according to the present invention comprises a first piezoelectric base plate polarized in a direction of thickness, a second piezoelectric base plate laminated on the first piezoelectric base plate, and polarized in the same direction as the polarizing direction of the first piezoelectric base plate, two first divided electrodes formed on a main surface of the first piezoelectric base plate, two second divided electrodes formed on a main surface of the second piezoelectric base plate, a common electrode formed between the first piezoelectric base plate and the second piezoelectric base plate, a driving means for applying a driving signal between one first divided electrode, one second divided electrode and the common electrode, and a detecting means for detecting a signal generated between the one first divided electrode and the one second divided electrode, wherein the other first divided electrode and the other second divided electrode are connected each other. In the vibrating gyroscope, for example, the driving means includes an oscillation circuit whose one output terminal is connected to the one first divided electrode and the one second divided electrode, and another output terminal is connected to the common electrode, and the detecting means includes a differential amplifier circuit whose two input terminals are respectively connected to the one first divided electrode and the one second divided electrode.

A still separate vibrating gyroscope according to the present invention comprises a first piezoelectric base plate polarized in a direction of thickness, a second piezoelectric base plate laminated on the first piezoelectric base plate, and polarized in the same direction as the polarizing direction of the first piezoelectric base plate, two first divided electrodes formed on a main surface of the first piezoelectric base plate, two second divided electrodes formed on a main surface of the second piezoelectric base plate, a common electrode formed between the first piezoelectric base plate and the second piezoelectric base plate, a driving means for applying a driving signal between the two first divided electrodes, the two second divided electrodes and the common electrode, and a detecting means for detecting a signal generated between one first divided electrode, one second divided electrode, the other first divided electrode and the other second divided electrode. In the vibrating gyroscope, for example, the driving means includes an oscillation circuit whose one output terminal is connected to the two first divided electrodes and the two second divided electrodes, and another output terminal is connected to the common electrode, and the detecting means includes a differential amplifier circuit whose one input terminal is connected to the one first divided electrode and the one second divided electrode, and another input terminal is connected to the other first divided electrode and the other second divided electrode.

In the vibrating gyroscope according to the present invention, the driving signal is applied between the two divided electrodes and the common electrode by the driving means. By the driving signal, the first piezoelectric base plate and the second piezoelectric base plate vibrate reversely each other. In this case, when the first piezoelectric base plate is extended in a direction parallel to its main surface, the second piezoelectric base plate is contracted in a direction parallel to its main surface. Conversely, when the first piezoelectric base plate is contracted in a direction parallel to its main surface, the second piezoelectric base plate is extended in a direction parallel to its main surface. Thus, the first piezoelectric base plate and the second piezoelectric base plate bend and vibrate in the direction perpendicular to their main surfaces. When the vibrating gyroscope is rotated in this state, a signal corresponding to its rotational angular velocity is generated between the two divided electrodes. The signal is detected by the detecting means.

In another vibrating gyroscope according to the present invention, the driving signal is applied between the first common electrode and the second common electrode by the driving means. By the driving signal, the first piezoelectric base plate and the second piezoelectric base plate vibrate reversely each other. In this case, when the first piezoelectric base plate is extended in a direction parallel to its main surface, the second piezoelectric base plate is contracted in a direction parallel to its main surface. Conversely, when the first piezoelectric base plate is contracted in a direction parallel to its main surface, the second piezoelectric base plate is extended in a direction parallel to its main surface. Thus, the first piezoelectric base plate and the second piezoelectric base plate bend and vibrate in the direction perpendicular to their main surfaces. When the vibrating gyroscope is rotated in this state, a signal corresponding to its rotational angular velocity is generated between the two divided electrodes. The signal is detected by the detecting means.

In still another vibrating gyroscope according to the present invention, the driving signal is applied between the two divided electrodes, the first common electrode and the second common electrode by the driving means. By the driving signal, the first piezoelectric base plate and second piezoelectric base plate vibrate reversely each other. In this case, when the first piezoelectric base plate is extended in a direction parallel to its main surface, the second piezoelectric base plate is contracted in a direction parallel to its main surface. Conversely, when the first piezoelectric base plate is contracted in a direction parallel to its main surface, the second piezoelectric base plate is extended in a direction parallel to its main surface. Thus, the first piezoelectric base plate and the second piezoelectric base plate bend and vibrate in the direction perpendicular to their main surfaces. When the vibrating gyroscope is rotated in this state, a signal corresponding to its rotational angular velocity is generated between the two divided electrodes. The signal is detected by the detecting means.

In the separate vibrating gyroscope according to the present invention, the driving signal is applied between the one first divided electrode, the one second divided electrode and the common electrode by the driving means. By the driving signal, the first piezoelectric base plate and the second piezoelectric base plate vibrate reversely each other. In this case, when the first piezoelectric base plate is extended in a direction parallel to its main surface, the second piezoelectric base plate is contracted in a direction parallel to its main surface. Conversely, when the first piezoelectric base plate is contracted in a direction parallel to its main surface, the second piezoelectric base plate is extended in a direction parallel to its main surface. Thus, the first piezoelectric base plate and the second piezoelectric base plate bend and vibrate in the direction perpendicular to their main surfaces. When the vibrating gyroscope is rotated in this state, a signal corresponding to its rotational angular velocity is generated between the one first divided electrode and the one second divided electrode. The signal is detected by the detecting means.

In the still separate vibrating gyroscope according to the present invention, the driving signal is applied between the two first divided electrodes, the two second divided electrodes and the common electrode by the driving means. By the driving signal, the first piezoelectric base plate and the second piezoelectric base plate vibrate reversely each other. In this case, when the first piezoelectric base plate is extended in a direction parallel to its main surface, the second piezoelectric base plate is contracted in a direction parallel to its main surface. Conversely, when the first piezoelectric base plate is contracted in a direction parallel to its main surface, the second piezoelectric base plate is extended in a direction parallel to its main surface. Thus, the first piezoelectric base plate and the second piezoelectric base plate bend and vibrate in the direction perpendicular to their main surfaces. When the vibrating gyroscope is rotated in this state, a signal corresponding to its rotational angular velocity is generated between the one first divided electrode, the one second divided electrode, the other first divided electrode and the other second divided electrode. The signal is detected by the detecting means.

According to the present invention, since an expensive metal material such as a Ni alloy is not used, the vibrating gyroscope, wherein the cost can be decreased and a signal being detected is hardly affected by the magnetic field and becomes disorder, is obtained.

The above and other objects, features, aspects and advantages of the present invention will become more apparent from the following detailed description of the embodiments with reference to the accompanying drawings.

DESCRIPTION OF THE PREFERRED EMBODIMENTS

Figure 1:
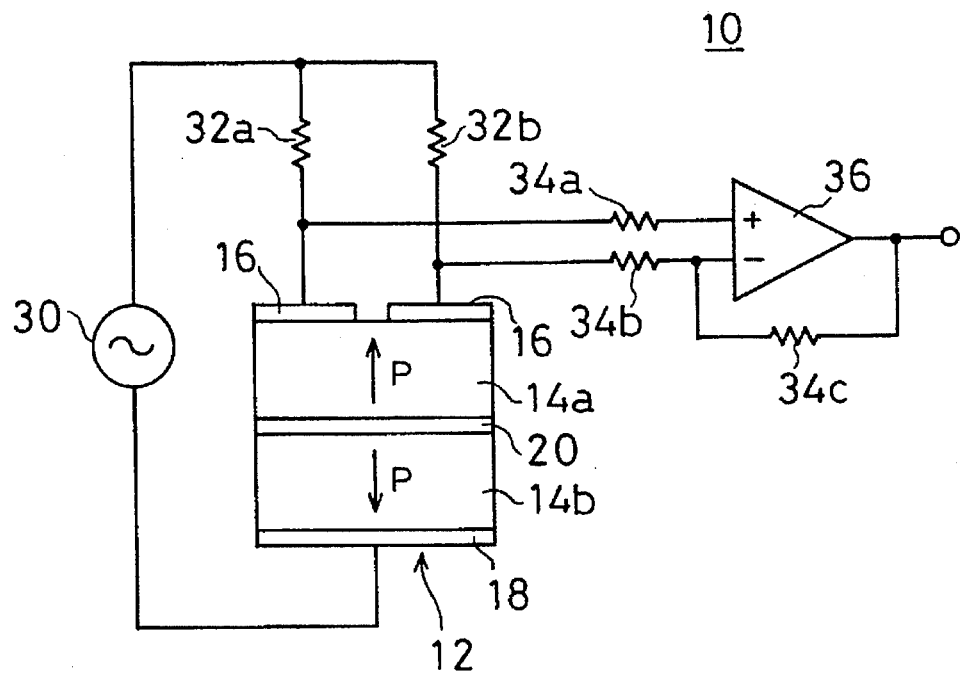
FIG. 1 is an illustrative view showing an embodiment of the present invention.

FIG. 1 is an illustrative view showing an embodiment of the present invention. A vibrating gyroscope 10 includes, for example, a regular quadrangular prism-shaped vibrator 12.

Figure 2:
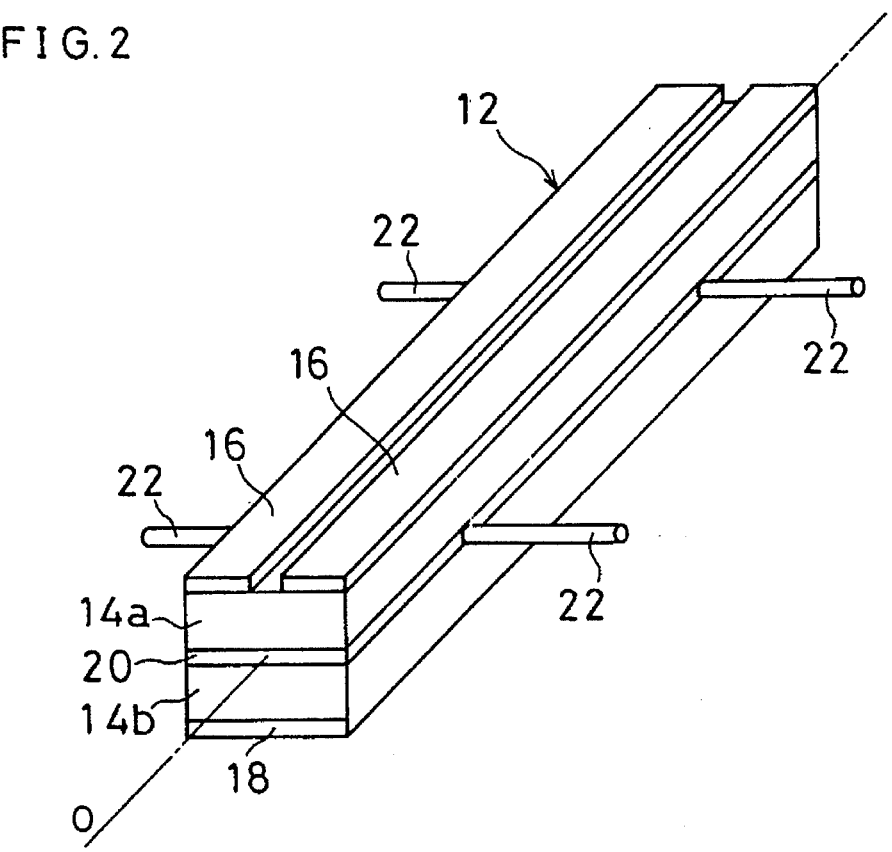
FIG. 2 is a perspective view showing a vibrator used in a vibrating gyroscope shown in FIG. 1.

As shown in FIG. 2, the vibrator 12 includes, for example, a rectangular first piezoelectric base plate 14a and a rectangular second piezoelectric base plate 14b. The first piezoelectric base plate 14a and the second piezoelectric base plate 14b are laminated and bonded together. The first piezoelectric base plate 14a and the second piezoelectric base plate 14b are polarized reversely each other in a direction of thickness as shown by arrows P in FIG. 1. The polarizing directions of the first piezoelectric base plate 14a and the second piezoelectric base plate 14b may be in the directions facing each other.

On a main surface of the first piezoelectric base plate 14a, two divided electrodes 16, 16 are formed in laterally spaced relationship. On a main surface of the second piezoelectric base plate 14b, a common electrode 18 is formed. Furthermore, a dummy electrode 20 is formed between the first piezoelectric base plate 14a and the second piezoelectric base plate 14b. The dummy electrode 20 may not be formed.

Figure 3:
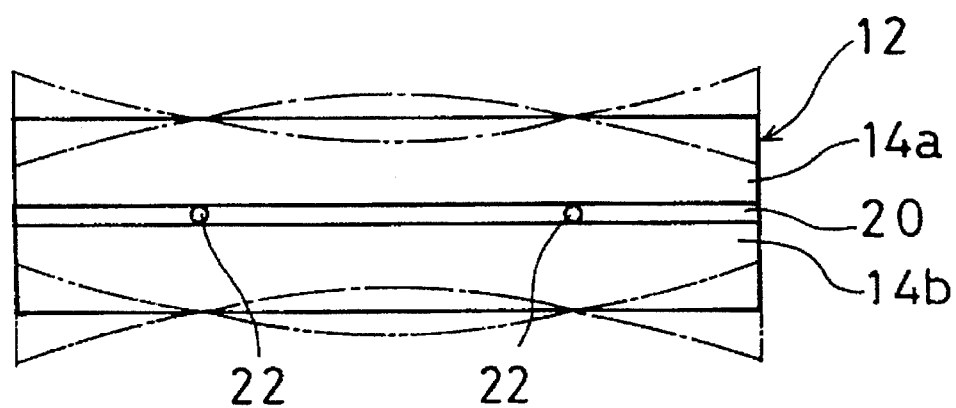
FIG. 3 is an illustrative side view showing the bending and vibrating state of the vibrator shown in FIG. 2.

In the vibrator 12, since the first piezoelectric base plate 14a and the second piezoelectric base plate 14b are polarized reversely each other in the direction of thickness, when a driving signal such as a sine-wave signal is applied between the two divided electrodes 16, 16 and the common electrode 18, the first piezoelectric base plate 14a and the second piezoelectric base plate 14b vibrate reversely each other. In this case, when the first piezoelectric base plate 14a is extended in a direction parallel to its main surface, the second piezoelectric base plate 14b is contracted in a direction parallel to its main surface. Conversely, when the first piezoelectric base plate 14a is contracted in a direction parallel to its main surface, the second piezoelectric base plate 14b is extended in a direction parallel to its main surface. Thus, as shown in FIG. 3, the first piezoelectric base plate 14a and the second piezoelectric base plate 14b bend and vibrate in the direction perpendicular to their main surfaces, keeping little inward portions from opposite end portions in a lengthwise direction as nodal portions. Thus, as shown in FIG. 2, to the vicinity of the nodal portions of the vibrator 12, for example, linear supporting members 22 are fixed, respectively. The vibrator 12 is supported by the supporting members 22. Even when the supporting members 22 are fixed to the vicinity of the nodal portions on the upper face or lower face of the vibrator 12, the vibrator 12 can be supported without largely affecting the vibration.

For applying the driving signal as aforementioned to the vibrator 12, as shown in FIG. 1, one output terminal of an oscillation circuit 30 as a driving means is connected to the two divided electrodes 16, 16 of the vibrator 12 via resistors 32a and 32b. Furthermore, another output terminal of the oscillation circuit 30 is connected to the common electrode 18 of the vibrator 12.

The two divided electrodes 16, 16 of the vibrator 12 are respectively connected to a non-inverting input terminal and an inverting input terminal of a differential amplifier circuit 36 as a detecting means via resistors 34a and 34b. Furthermore, a resistor 34c is connected between an output terminal and the inverting input terminal of the differential amplifier circuit 36.

Figure 4A:
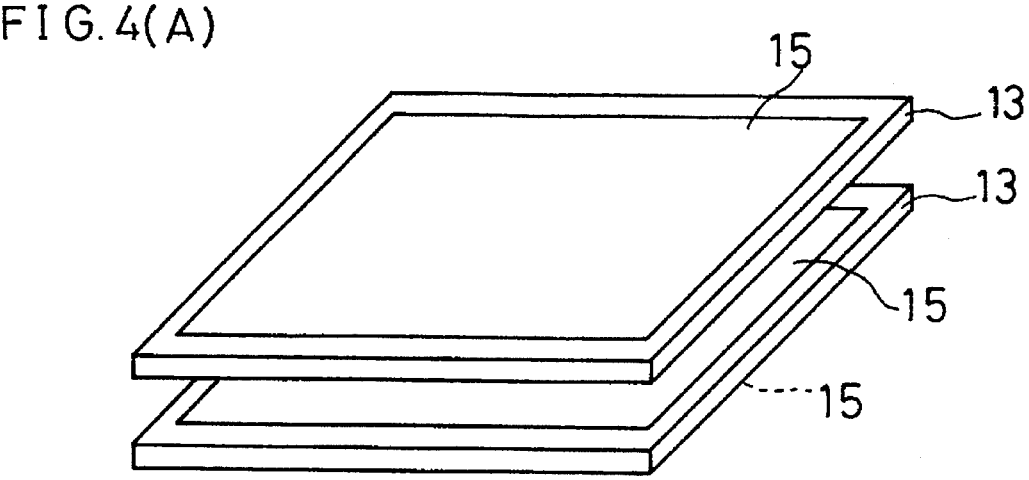
FIG. 4(A), FIG. 4(B) and FIG. 4(C) are illustrative views showing a process of manufacturing the vibrating gyroscope shown in FIG. 1.

For manufacturing the vibrating gyroscope 10, as shown in FIG. 4(A), two piezoelectric base plats 13, 13 polarized reversely in a direction of thickness are bonded by means of epoxy resin and the like. In this case, on both main surfaces of the piezoelectric base plates 13, 13, electrodes 15 are formed, respectively.

Figure 4B:
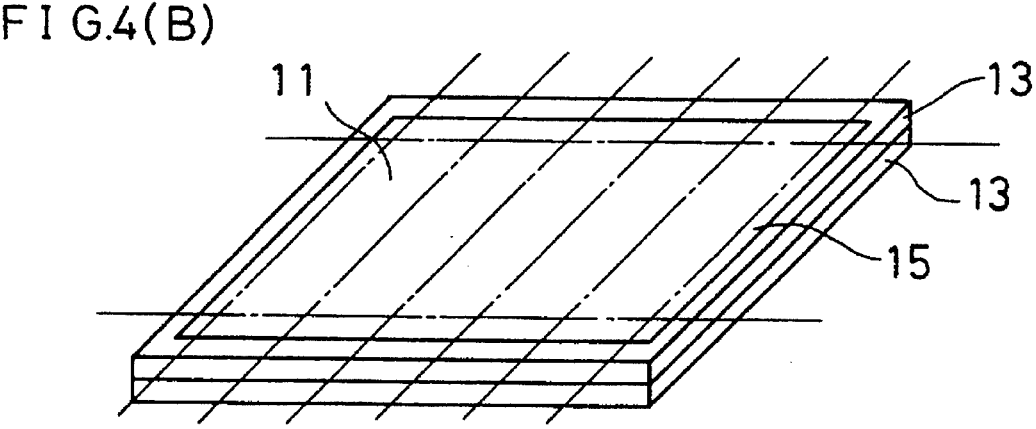

The two bonded piezoelectric base plates 13, 13 are cut at portions shown by one-dot-chain lines in FIG. 4(B), thereby each element 11 is formed.

Figure 4C:
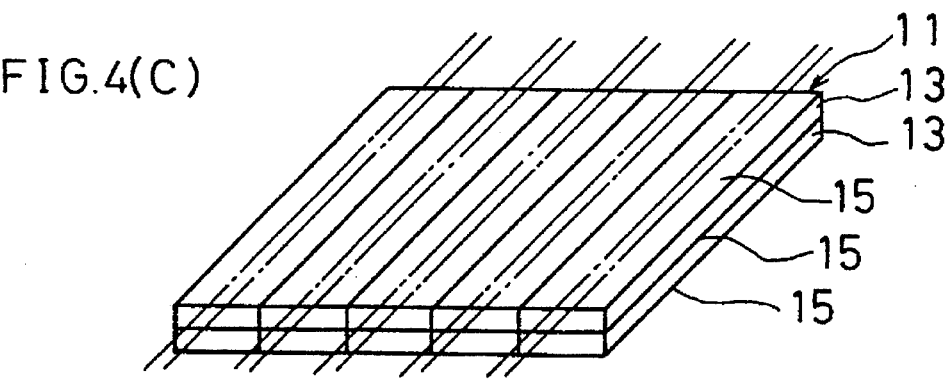

Next, in one electrode 15 on the outside of the elements 11, as shown by one-dot-chain lines in FIG. 4(C), grooves are cut at the lateral center thereof. Thereby, the divided electrodes 16, 16 are formed, the vibrators 12 are mass-produced.

Then, to the vibrator 12, the supporting members 22 are fixed, and the oscillation circuit 30, the resistors 32a, 32b, 34a, 34b and 34c and the differential amplifier circuit 36 are connected.

In the vibrating gyroscope 10, the driving signal such as the sine-wave signal outputted from the oscillation circuit 30 is applied between the two divided electrodes 16, 16 and the common electrode 18 of the vibrator 12 via the resistors 32a and 32b.

By the driving signal, the first piezoelectric base plate 14a and the second piezoelectric base plate 14b bend and vibrate in the direction perpendicular to their main surfaces as shown in FIG. 3.

When the vibrating gyroscope 10 is rotated about a center axis O (FIG. 2) of the vibrator 12 in this state, a Coriolis force corresponding to its rotational angular velocity is exerted, in a direction parallel to the main surfaces of the first piezoelectric base plate 14a and the second piezoelectric base plate 14b and perpendicular to the center axis O of the vibrator 12. Thus, the bending and vibrating direction of the vibrator 12 is changed. Accordingly, a signal corresponding to its rotational angular velocity is generated between the two divided electrodes 16, 16.

The signal generated between the divided electrodes 16, 16 is detected by the differential amplifier circuit 36 via the resistors 34a and 34b.

Thus, in the vibrating gyroscope 10, the rotational angular velocity can be known by the output signal of the differential amplifier circuit 36.

In the vibrating gyroscope 10, since the expensive metal material such as the Ni alloy is not used, the cost can be decreased and the signal being detected is hardly affected by a magnetic field and becomes disorder.

Furthermore, in the vibrating gyroscope 10, since the vibrator 12 is supported by the supporting members 22 fixed to the vicinity of the nodal portions of the vibrator 12, vibration hardly leaks to the outside from the vibrator 12, and the vibrator 12 can be vibrated efficiently.

In the vibrating gyroscope 10, a large number of vibrators 12 can be manufactured by a simple process as aforementioned, results in a good productivity.

Figure 5:
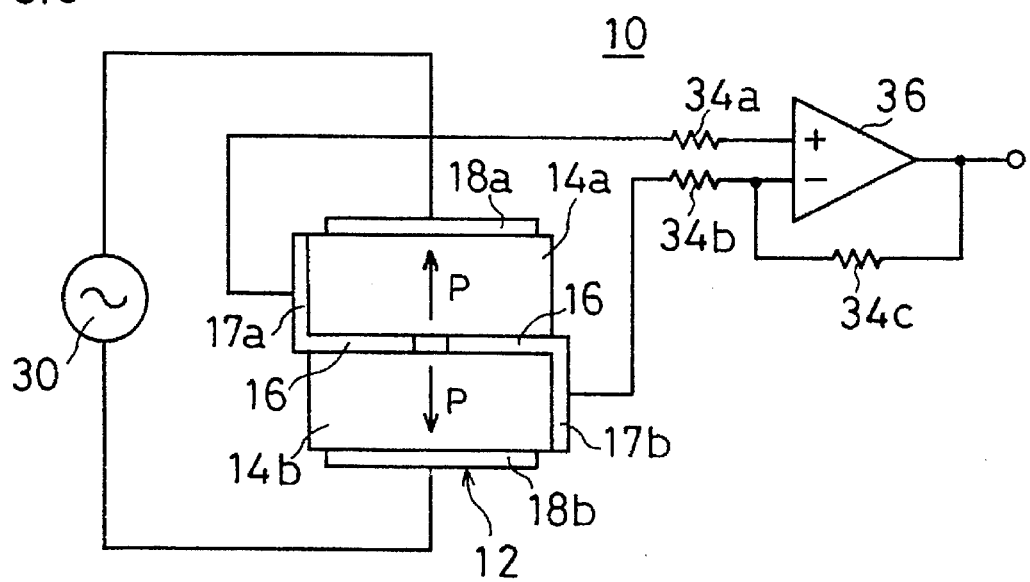
FIG. 5 is an illustrative view showing another embodiment of the present invention.

FIG. 5 is an illustrative view showing another embodiment of the present invention. The vibrating gyroscope 10 shown in FIG. 5 includes, for example, a regular quadrangular prism-shaped vibrator 12.

Figure 6:
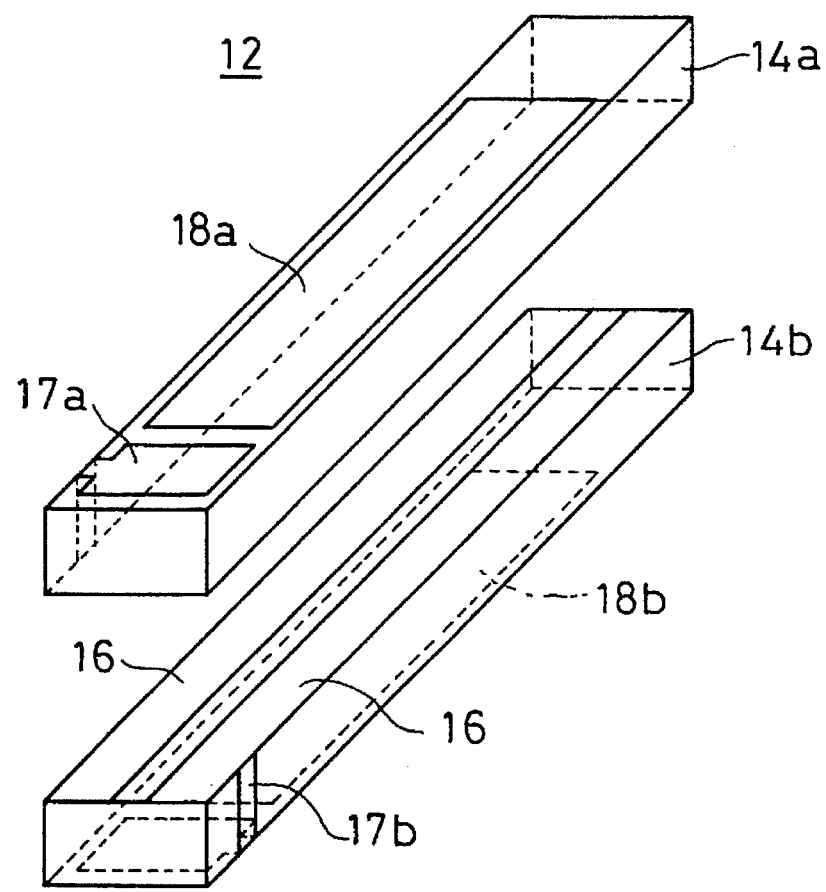
FIG. 6 is an exploded perspective view showing a vibrator used in a vibrating gyroscope shown in FIG. 5.

As shown in FIG. 6, the vibrator 12 includes, for example, a rectangular first piezoelectric base plate 14a and a rectangular second piezoelectric base plate 14b. The first piezoelectric base plate 14a and the second piezoelectric base plate 14b are laminated and bonded together. The first piezoelectric base plate 14a and the second piezoelectric base plate 14b are polarized reversely each other in a direction of thickness as shown by arrows P in FIG. 5. The polarizing directions of the first piezoelectric base plate 14a and the second piezoelectric base plate 14b may be in the directions facing each other.

Between the first piezoelectric base plate 14a and the second piezoelectric base plate 14b, two divided electrodes 16, 16 are formed in laterally spaced relationship. To one divided electrode 16, a drawing electrode 17a formed on a side face and an end portion of the main surface of the first piezoelectric base plate 14a is connected. To the other divided electrode 16, a drawing electrode 17b formed on a side face and an end portion of the second piezoelectric base plate 14b is connected. At a center portion of the main surface of the first piezoelectric base plate 14a, a first common electrode 18a is formed. Furthermore, at a center portion of the main surface of the second piezoelectric base plate 14b, a second common electrode 18b is formed.

In the vibrator 12, since the first piezoelectric base plate 14a and the second piezoelectric base plate 14b are polarized reversely each other in the direction of thickness, when a driving signal such as a sine-wave signal is applied between the first common electrode 18a and the second common electrode 18b, the first piezoelectric base plate 14a and the second piezoelectric base plate 14b vibrate reversely each other. Thus, the first piezoelectric base plate 14a and the second piezoelectric base plate 14b bend and vibrate in the direction perpendicular to their main surfaces, keeping little inward portions from opposite end portions in a lengthwise direction as nodal portions. Thus, to the vicinity of the nodal portions of the vibrator 12, as same as the vibrator shown in FIG. 2, for example, linear supporting members (not shown) are fixed, respectively. The vibrator 12 is supported by the supporting members. The supporting members may be fixed to the vicinity of the nodal portions on the upper face or lower face of the vibrator 12.

For applying the driving signal as aforementioned to the vibrator 12, as shown in FIG. 5, one output terminal of an oscillation circuit 30 as a driving means is connected to the first common electrode 18a. Furthermore, another output terminal of the oscillation circuit 30 is connected to the second common electrode 18b of the vibrator 12.

The two divided electrodes 16, 16 of the vibrator 12 are respectively connected to a non-inverting input terminal and an inverting input terminal of a differential amplifier circuit 36 as a detecting means via the drawing electrodes 17a, 17b and resistors 34a, 34b. Furthermore, a resistor 34c is connected between an output terminal and the inverting input terminal of the differential amplifier circuit 36.

In the vibrating gyroscope 10 shown in FIG. 5, the driving signal such as the sine-wave signal outputted from the oscillation circuit 30 is applied between the first common electrode 18a and the second common electrode 18b of the vibrator 12.

By the driving signal, the first piezoelectric base plate 14a and the second piezoelectric base plate 14b vibrate reversely each other, and bend and vibrate in the direction perpendicular to their main surfaces.

When the vibrating gyroscope 10 is rotated about a center axis of the vibrator 12 in this state, a Coriolis force corresponding to its rotational angular velocity is exerted, in a direction parallel to the main surfaces of the first piezoelectric base plate 14a and the second piezoelectric base plate 14b and perpendicular to the center axis of the vibrator 12. Thus, the bending and vibrating direction of the vibrator 12 is changed. Accordingly, a signal corresponding to its rotational angular velocity is generated between the two divided electrodes 16, 16.

The signal generated between the two divided electrodes 16, 16 is detected by the differential amplifier circuit 36 via the drawing electrodes 17a and 17b.

Thus, in the vibrating gyroscope 10 shown in FIG. 5, the rotational angular velocity can be known by the output signal of the differential amplifier circuit 36.

In the vibrating gyroscope 10 shown in FIG. 5, since the expensive metal material such as the Ni alloy is not used, the cost can be decreased and the signal being detected is hardly affected by a magnetic field and becomes disorder.

In the vibrating gyroscope 10 shown in FIG. 5, since the vibrator 12 is supported by the supporting members fixed to the vicinity of the nodal portions of the vibrator 12, vibration hardly leaks to the outside from the vibrator 12.

Furthermore, in the vibrating gyroscope 10 shown in FIG. 5, a large number of vibrators 12 can be manufactured by a simple process by laminating, bonding and cutting the two piezoelectric base plates and so on, results in a good productivity.

Figure 7:
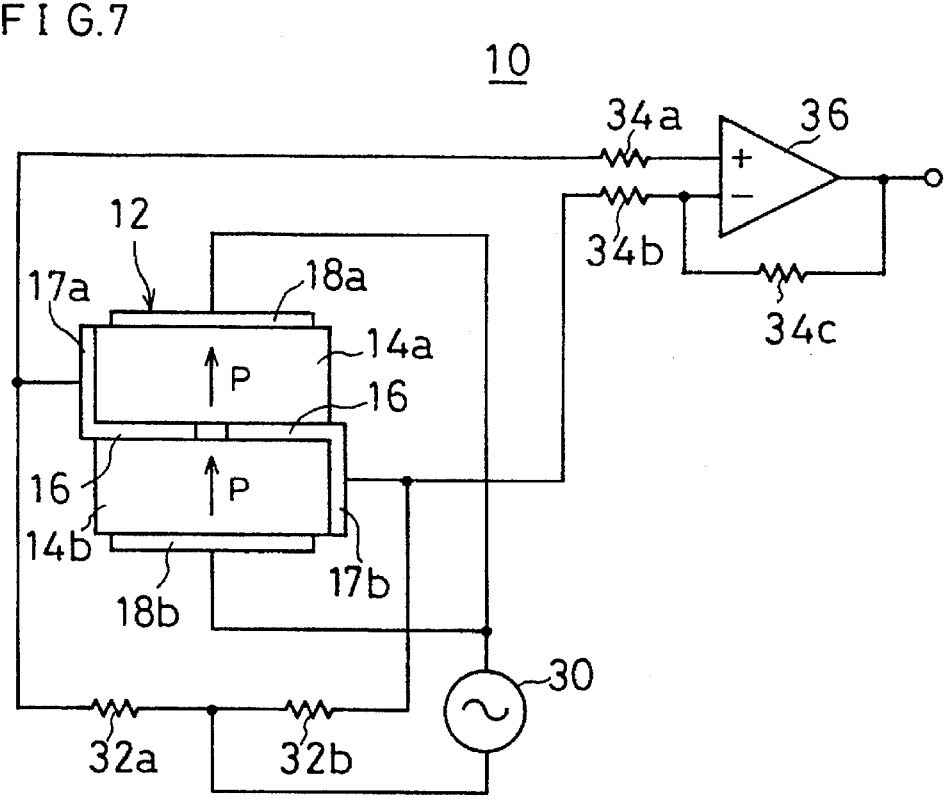
FIG. 7 is an illustrative view showing still another embodiment of the present invention.

FIG. 7 is an illustrative view showing still another embodiment of the present invention. In the embodiment shown in FIG. 7, as compared with the embodiment shown in FIG. 5, the first piezoelectric base plate 14a and the second piezoelectric base plate 14b of the vibrator 12 are polarized in the same direction of thickness as shown by arrows P in FIG. 7. The polarizing directions of the first piezoelectric base plate 14a and the second piezoelectric base plate 14b may be in the same direction opposite to the direction shown in FIG. 7.

In the embodiment shown in FIG. 7, one output terminal of the oscillation circuit 30 is respectively connected to the two divided electrode 16, 16 of the vibrator 12 via the drawing electrodes 17a, 17b and resistors 32a, 32b. Furthermore, another output terminal of the oscillation circuit 30 is connected to the first common electrode 18a and the second common electrode 18b.

The two divided electrode 16, 16 of the vibrator 12 are respectively connected to the non-inverting input terminal and the inverting input terminal of the differential amplifier circuit 36 as the detecting means via the drawing electrodes 17a, 17b and the resistors 34a, 34b. Furthermore, the resistor 34c is connected between the output terminal and the inverting input terminal of the differential amplifier circuit 36.

In the vibrating gyroscope 10 shown in FIG. 7, the driving signal such as the sine-wave signal outputted from the oscillation circuit 30 is applied between the two divided electrodes 16, 16, the first common electrode 18a and the second common electrode 18b of the vibrator 12, via the resistors 32a, 32b and the drawing electrodes 17a, 17b.

By the driving signal, the first piezoelectric base plate 14a and the second piezoelectric base plate 14b vibrate reversely each other, and bend and vibrate in the direction perpendicular to their main surfaces.

When the vibrating gyroscope 10 is rotated about the center axis of the vibrator 12 in this state, a Coriolis force corresponding to its rotational angular velocity is exerted, in the direction parallel to the main surfaces of the first piezoelectric base plate 14a and the second piezoelectric base plate 14b and perpendicular to the center axis of the vibrator 12. Thus, the bending and vibrating direction of the vibrator 12 is changed. Accordingly, a signal corresponding to its rotational angular velocity is generated between the two divided electrodes 16, 16.

The signal generated between the two divided electrode 16, 16 is detected by the differential amplifier circuit 36 via the drawing electrodes 17a, 17b.

Thus, in the vibrating gyroscope 10 shown in FIG. 7, the rotational angular velocity can be known by the output signal of the differential amplifier circuit 36.

In the vibrating gyroscope 10 shown in FIG. 7, since the driving signal applied per unit thickness of the first piezoelectric base plate 14a and the second piezoelectric base plate 14b becomes larger, the bending and vibrating amplitude of the piezoelectric base plates and the output signal amplitude become larger, results in a good sensibility.

In the vibrating gyroscope 10 shown in FIG. 7, since the expensive metal material such as the Ni alloy is not used, the cost can be decreased and the signal being detected is hardly affected by the magnetic field and becomes disorder.

In the vibrating gyroscope 10 shown in FIG. 7, since the vibrator 12 is supported by the supporting members fixed to the vicinity of the nodal portions of the vibrator 12, vibration hardly leaks to the outside from the vibrator 12.

Furthermore, also in the vibrating gyroscope 10 shown in FIG. 7, a large number of vibrators 12 can be manufactured by a simple process by laminating, bonding and cutting the two piezoelectric base plates and so on, results in a good productivity.

Figure 8:
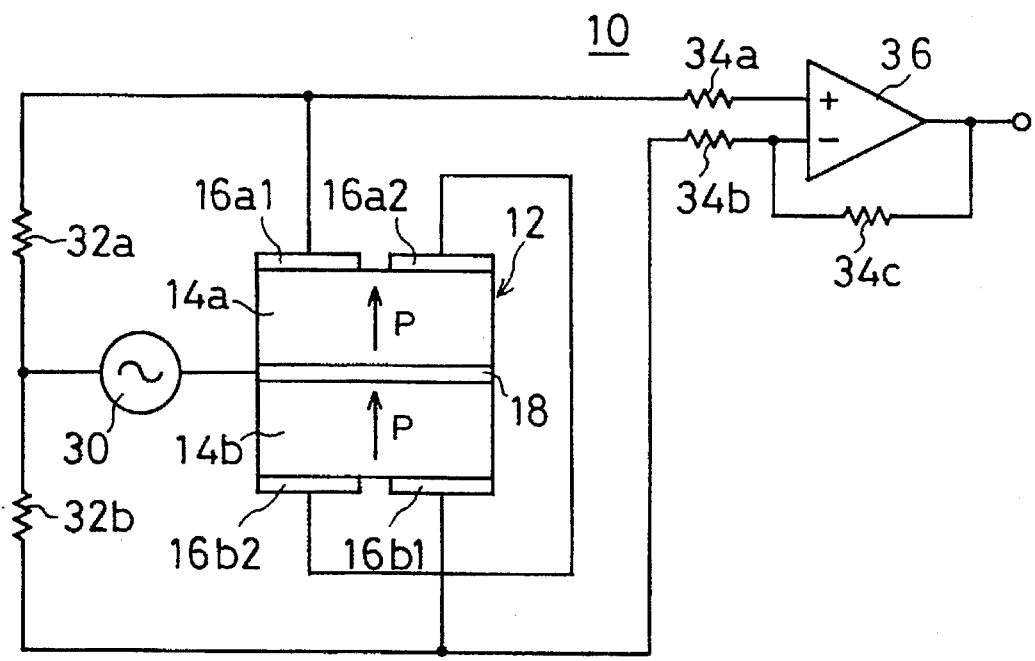
FIG. 8 is an illustrative view showing a separate embodiment of the present invention.

FIG. 8 is an illustrative view showing a separate embodiment of the present invention. The vibrating gyroscope 10 includes, for example, a regular quadrangular prism-shaped vibrator 12.

Figure 9:
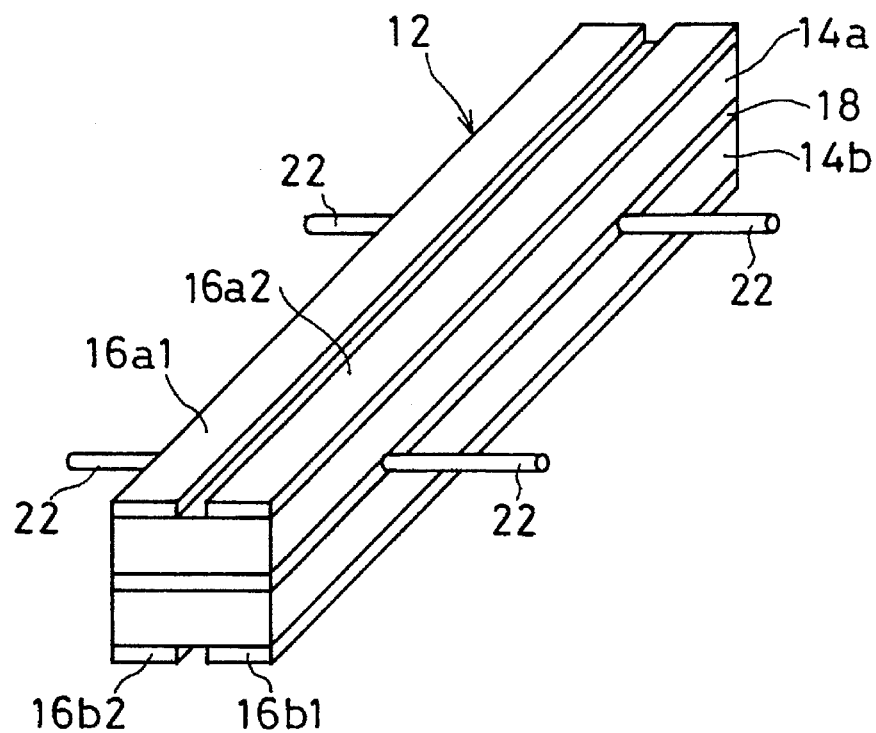
FIG. 9 is a perspective view showing a vibrator used in a vibrating gyroscope shown in FIG. 8.

As shown in FIG. 9, the vibrator 12 includes, for example, a rectangular first piezoelectric base plate 14a and a rectangular second Piezoelectric base plate 14b. The first piezoelectric base plate 14a and second piezoelectric base plate 14b are laminated and bonded together. The first piezoelectric base plate 14a and second piezoelectric base plate 14b are polarized in the same direction of thickness as shown by arrows p in FIG. 8. The polarizing directions of the first piezoelectric base plate 14a and the second piezoelectric base plate 14b may be in the same direction opposite to the direction shown in FIG. 8.

On a main surface of the first Piezoelectric base plate 14a, two first divided electrodes 16a1, 16a2 are formed in laterally spaced relationship. On a main surface of the second piezoelectric base plate 14b, two second divided electrodes 16b1, 16b2 are formed in laterally spaced relationship. Furthermore, between the first piezoelectric base plate 14a and second piezoelectric base plate 14b, a common electrode 18 is formed.

In the vibrator 12, since the first Piezoelectric base plate 14a and the second piezoelectric base plate 14b are polarized in the same direction of thickness, when a driving signal such as a sine-wave signal is applied between the first divided electrodes, the second divided electrodes and the common electrode, the first piezoelectric base plate 14a and the second piezoelectric base plate 14b vibrate reversely each other. Thus, the first piezoelectric base plate 14a and the second piezoelectric base plate 14b bend and vibrate in the direction perpendicular to their main surfaces, keeping little inward portions from opposite end portions in a lengthwise direction as nodal portions. Thus, to the vicinity of the nodal portions of the vibrator 12, for example, linear supporting members 22 are fixed, respectively. The vibrator 12 is supported by the supporting members 22. The supporting members may be fixed to the vicinity of the nodal portions on the upper face or lower face of the vibrator 12.

For applying the driving signal as aforementioned to the vibrator 12, as shown in FIG. 8, one output terminal of an oscillation circuit 30 as a driving means is connected to one first divided electrode 16a1 and one second divided electrode 16b1, via resistors 32a, 32b. Furthermore, another output terminal of the oscillation circuit 30 is connected to the common electrode 18 of the vibrator 12.

The one first divided electrode 16a1 and the one second divided electrode 16b1 of the vibrator 12 are respectively connected to a non-inverting input terminal and an inverting input terminal of a differential amplifier circuit 36 as a detecting means, via resistors 34a and 34b. Furthermore, the other first divided electrode 16a2 and the other second divided electrode 16b2 are connected each other.

In the vibrating gyroscope 10 shown in FIG. 8, the driving signal such as the sine-wave signal outputted from the oscillation circuit 30 is applied between the one first divided electrode 16a1, the one second divided electrode 16b1 and the common electrode 18 of the vibrator 12, via the resistors 32a and 32b.

By the driving signal, the first piezoelectric base plate 14a and the second piezoelectric base plate 14b vibrate reversely each other, and bend and vibrate in the direction perpendicular to their main surfaces.

When the vibrating gyroscope 10 is rotated about a center axis of the vibrator 12 in this state, a Coriolis force corresponding to its rotational angular velocity is exerted, in a direction parallel to the main surfaces of the first piezoelectric base plate 14a and the second piezoelectric base plate 14b and perpendicular to the center axis of the vibrator 12. Thus, the bending and vibrating direction of the vibrator 12 is changed. Accordingly, signals corresponding to its rotational angular velocity are respectively generated between the two first divided electrodes 16a1, 16a2, and between the two second divided electrodes 16a1, 16a2.

A signal obtained by composing the signal generated between the two first divided electrodes 16a1, 16a2 and the signal generated between the two second divided electrodes 16b1, 16b2 in series is detected by the differential amplifier circuit 36.

Thus, in the vibrating gyroscope 10 shown in FIG. 8, the rotational angular velocity can be known by the output signal of the differential amplifier circuit 36.

In the vibrating gyroscope 10 shown in FIG. 8, since the driving signal applied per unit thickness of the first piezoelectric base plate 14a and the second piezoelectric base plate 14b becomes larger, the bending and vibrating amplitude of the piezoelectric base plates and the output signal amplitude become larger, results in a good sensibility.

Furthermore, in the vibrating gyroscope 10 shown in FIG. 8, since the signal obtained by composing the signal generated between the two first divided electrodes 16a1, 16a2 and the signal generated between the two second divided electrodes 16b1, 16b2 in series is detected, the output signal amplitude becomes more larger and the sensitivity is improved more.

Meanwhile, in the vibrating gyroscope 10 shown in FIG. 8, since the expensive metal material such as the Ni alloy is not used, the cost can be decreased and the signal being detected is hardly affected by the magnetic field and becomes disorder.

In the vibrating gyroscope 10 shown in FIG. 8, since the vibrator 12 is supported by the supporting members 22 fixed to the vicinity of the nodal portions of the vibrator 12, vibration hardly leaks to the outside from the vibrator 12.

Furthermore, in the vibrating gyroscope 10 shown in FIG. 8, a large number of vibrators 12 can be manufactured by a simple process by laminating, bonding and cutting the two piezoelectric base plates and so on, results in a good productivity.

Figure 10:
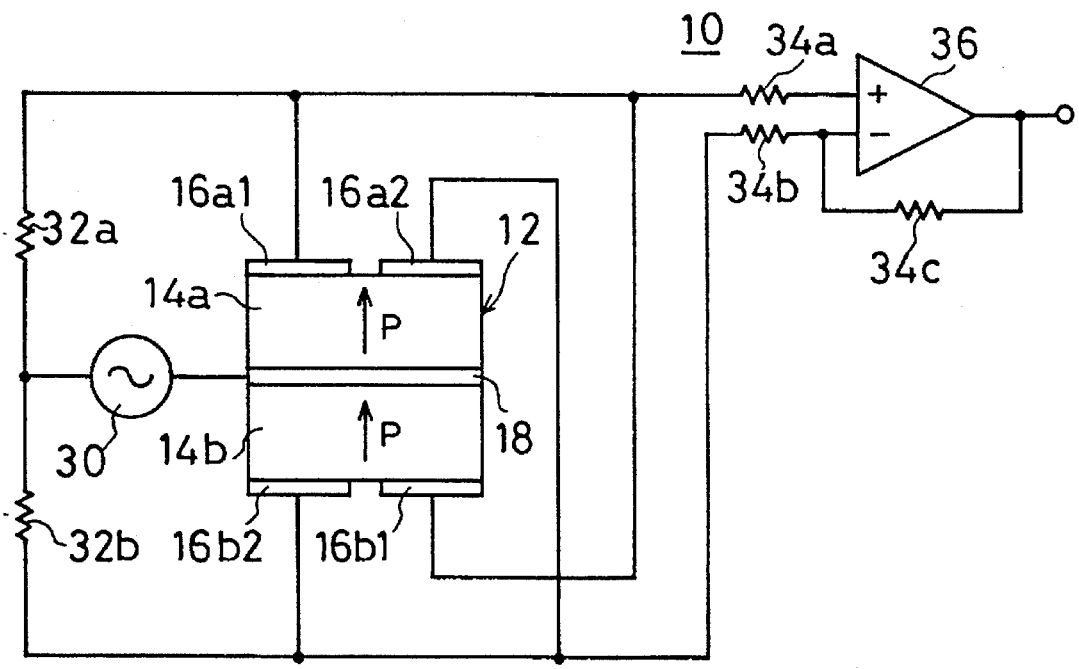
FIG. 10 is an illustrative view showing a still separate embodiment of the present invention.

FIG. 10 is an illustrative view showing a still separate embodiment of the present invention. In the embodiment shown in FIG. 10, the vibrator 12 shown in FIG. 8 and FIG. 9 is used.

In the embodiment shown in FIG. 10, one output terminal of an oscillation circuit 30 is connected to the one first divided electrode 16a1 and the one second divided electrode 16b1 via a resistor 32a, and connected to the other first divided electrode 16a2 and the other second divided electrode 16b2 via a resistor 32b. Furthermore, another output terminal of the oscillation circuit 30 is connected to the common electrode 18.

The one first divided electrode 16a1 and the one second divided electrode 16b1 of the vibrator 12 are connected to a non-inverting input terminal of a differential amplifier circuit 36 as a detecting means via a resistor 34a, and the other first divided electrode 16a2 and the other second divided electrode 16b2 are connected to an inverting input terminal of the differential amplifier circuit 36 via a resistor 34b. Furthermore, a resistor 34c is connected between an output terminal and the inverting input terminal of the differential amplifier circuit 36.

In the vibrating gyroscope 10 shown in FIG. 10, a driving signal such as a sine-wave signal outputted from the oscillation circuit 30 is applied between the two first divided electrodes 16a1, 16a2, the two second divided electrodes 16b1, 16b2 and the common electrode 18 of the vibrator 12, via the resistors 32a, 32b.

By the driving signal, the first piezoelectric base plate 14a and the second piezoelectric base plate 14b vibrate reversely each other, and bend and vibrate in the direction perpendicular to their main surfaces.

When the vibrating gyroscope 10 is rotated about a center axis of the vibrator 12 in this state, a Coriolis force corresponding to its rotational angular velocity is exerted, in a direction parallel to the main surfaces of the first piezoelectric base plate 14a and the second piezoelectric base plate 14b and perpendicular to the center axis of the vibrator 12. Thus, the bending and vibrating direction of the vibrator 12 is changed. Accordingly, signals corresponding to its rotational angular velocity are respectively generated between the two first divided electrodes 16a1, 16a2, and between the two second divided electrodes 16b1, 16b2.

A signal obtained by composing the signal generated between the two first divided electrodes 16a1, 16a2 and the signal generated between the two second divided electrodes 16b1, 16b2 in parallel is detected by the differential amplifier circuit 36.

Thus, in the vibrating gyroscope 10 shown in FIG. 10, the rotational angular velocity can be known by the output signal of the differential amplifier circuit 36.

In the vibrating gyroscope 10 shown in FIG. 10, since the driving signal applied per unit thickness of the first piezoelectric base plate 14a and the second piezoelectric base plate 14b becomes larger, the bending and vibrating amplitude of the piezoelectric base plates and the output signal amplitude become larger, results in a good sensibility.

Furthermore, in the vibrating gyroscope 10 shown in FIG. 10, the signal obtained by composing the signal generated between the two first divided electrodes 16a1, 16a2 and the signal generated between the two second divided electrodes 16b1, 16b2 in parallel is detected, the output signal is stabilized by lowering an output impedance, results in a stable sensibility.

Meanwhile, in the vibrating gyroscope 10 shown in FIG. 10, since the expensive metal material such as the Ni alloy is not used, the cost can be decreased and the signal being detected is hardly affected by the magnetic field and becomes turbulent.

In the vibrating gyroscope 10 shown in FIG. 10, since the vibrator 12 is supported by the supporting members fixed to the vicinity of the nodal portions of the vibrator 12, vibration hardly leaks to the outside from the vibrator 12.

Furthermore, in the vibrating gyroscope 10 shown in FIG. 10, a large number of vibrators 12 can be manufactured by a simple process by laminating, bonding and cutting the two piezoelectric base plates and so on, results in a good productivity.

Figure 11:
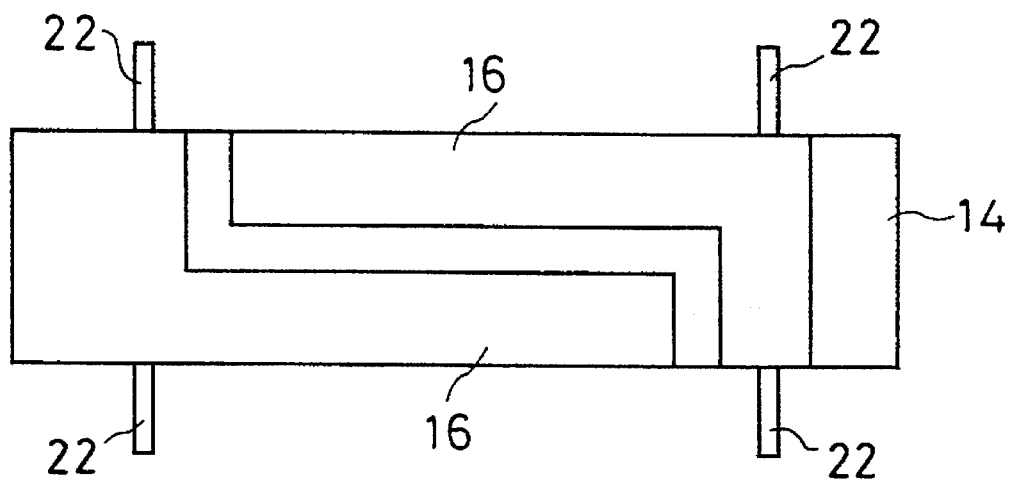
FIG. 11 is a plan view showing another example of a divided electrode.

Meanwhile, in the aforementioned embodiments, though the divided electrodes, the first divided electrodes and the second divided electrodes are formed into an I shape lengthwise from one end to the other end of the piezoelectric base plate, as shown in FIG. 11, the divided electrodes 16 may be formed into an L shape between the two nodal portions of the piezoelectric base plate 14. When the divided electrodes are formed between the nodal portions of the piezoelectric base plate, a vibration efficiency of the piezoelectric base plate by the divided electrodes and so on, and a detecting efficiency of the signal corresponding to the rotational angular velocity are improved.

Figure 12:
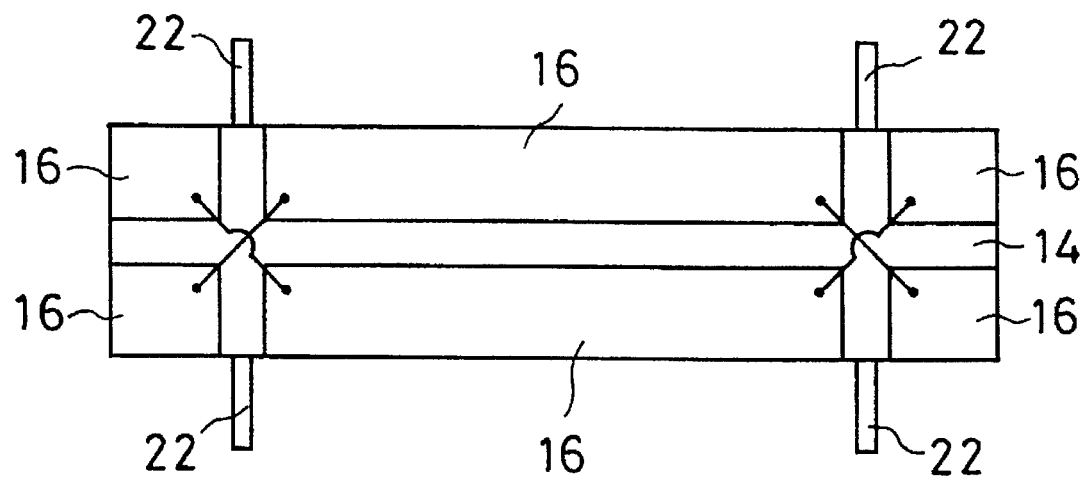
FIG. 12 is a plan view showing still another example of a divided electrode.

Since the polarity of the generating voltage is reverse at inside and outside of the nodal portions, when considering this point, as shown in FIG. 12, the divided electrodes 16 may be cut and connected alternately at the two nodal portions of the piezoelectric base plate 14. Even in the case, a vibration efficiency of the piezoelectric base plate by the divided electrodes and so on, and a detecting efficiency of the signal corresponding to the rotational angular velocity are improved.

Figure 13:
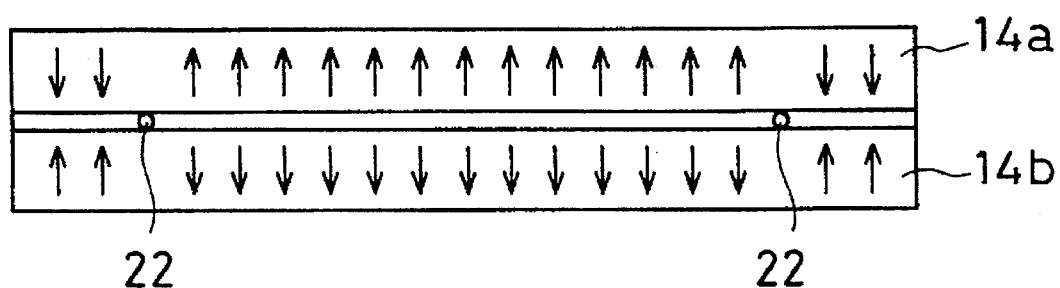
FIG. 13 is an illustrative side view showing another example of a piezoelectric base plate.

In the aforementioned embodiments, though each piezoelectric base plate is polarized in the same direction, as shown by arrows in FIG. 13, the piezoelectric base plates 14a and 14b may be polarized reversely at the inner portion and the outer portion of the nodal portions. Even in the case, a vibration efficiency of the piezoelectric base plate and a detecting efficiency of the signal corresponding to the rotational angular velocity are improved.

Figure 14:
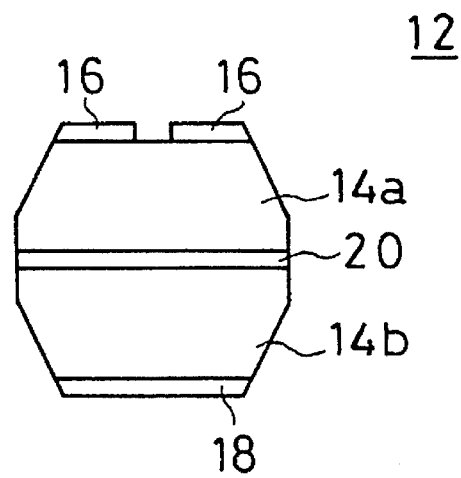
FIG. 14 is an illustrative sectional view showing another example of a vibrator.
Figure 15:
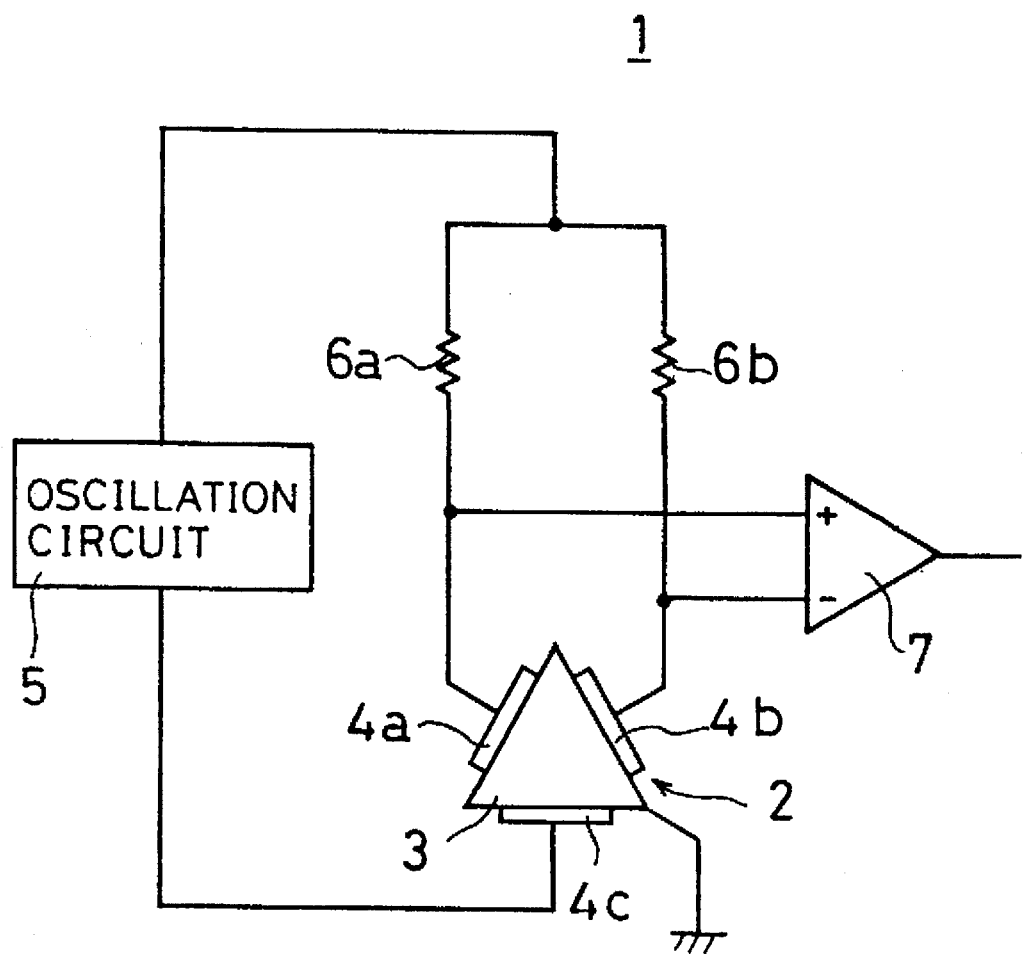
FIG. 15 is an illustrative view showing an example of a conventional vibrating gyroscope.

Furthermore, in the aforementioned embodiments, though the vibrator is formed into a regular quadrangular prism-shape, as shown in FIG. 14, the vibrator 12 may be formed into an octagonal prism-shape or into another shape. The vibrator is preferably formed into the regular quadrangular prism-shape, to obtain the bending and vibrating motion by the driving signal and the Coriolis force or the signal corresponding to the rotational angular velocity efficiently.

It will be apparent from the foregoing that, while the present invention has been described in detail and illustrated, these are only particular illustration and example, and the present invention is not limited to these. The spirit and scope of the present invention is limited only by the appended claims.

What is claimed is:

1. A vibrating gyroscope comprising:
a first piezoelectric base plate polarized in a direction of thickness;
a second piezoelectric base plate laminated on said first piezoelectric base plate, and polarized in a reverse direction of the polarizing direction of said first piezoelectric base plate;
two divided electrodes formed on a main surface of said first piezoelectric base plate;
a common electrode formed on a main surface of said second piezoelectric base plate;
a driving means for applying a driving signal between said two divided electrodes and said common electrode; and
a detecting means for detecting a signal generated between said two divided electrodes.

2. A vibrating gyroscope according to claim 1, wherein said driving means includes an oscillation circuit whose one output terminal is connected to said two divided electrodes, and another output terminal is connected to said common electrode, and
said detecting means includes a differential amplifier circuit whose two input terminals are respectively connected to said two divided electrodes.

3. A vibrating gyroscope comprising:
a first piezoelectric base plate polarized in a direction of thickness;
a second piezoelectric base plate laminated on said first piezoelectric base plate, and polarized in a reverse direction of the polarizing direction of said first piezoelectric base plate;
two divided electrodes formed between said first piezoelectric base plate and said second piezoelectric base plate;
a first common electrode formed on a main surface of said first piezoelectric base plate;
a second common electrode formed on a main surface of said second piezoelectric base plate;
a driving means for applying a driving signal between said first common electrode and said second common electrode; and
a detecting means for detecting a signal generated between said two divided electrodes.

4. A vibrating gyroscope according to claim 3, wherein said driving means includes an oscillation circuit whose one output terminal is connected to said first common electrode, and another output terminal is connected to said second common electrode, and
said detecting means includes a differential amplifier circuit whose two input terminals are respectively connected to said two divided electrodes.

5. A vibrating gyroscope comprising:
a first piezoelectric base plate polarized in a direction of thickness;
a second piezoelectric base plate laminated on said first piezoelectric base plate, and polarized in the same direction as the polarizing direction of said first piezoelectric base plate;
two divided electrodes formed between said first piezoelectric base plate and said second piezoelectric base plate;
a first common electrode formed on a main surface of said first piezoelectric base plate;
a second common electrode formed on a main surface of said second piezoelectric base plate;
a driving means for applying a driving signal between said two divided electrodes, said first common electrode and said second common electrode; and
a detecting means for detecting a signal generated between said two divided electrodes.

6. A vibrating gyroscope according to claim 5, wherein said driving means includes an oscillation circuit whose one output terminal is connected to said two divided electrodes, and another output terminal is connected to said first common electrode and said second common electrode; and
said detecting means includes a differential amplifier circuit whose two input terminals are respectively connected to said two divided electrodes.

7. A vibrating gyroscope comprising:
a first piezoelectric base plate polarized in a direction of thickness;
a second piezoelectric base plate laminated on said first piezoelectric base plate, and polarized in the same direction as the polarizing direction of said first piezoelectric base plate;

two first divided electrodes formed on a main surface of said first piezoelectric base plate;

two second divided electrodes formed on a main surface of said second piezoelectric base plate;

a common electrode formed between said first piezoelectric base plate and said second piezoelectric base plate;

a driving means for applying a driving signal between one first divided electrode, one second divided electrode and said common electrode; and a detecting means for detecting a signal generated between said one first divided electrode and said one second divided electrode; wherein the other first divided electrode and the other second divided electrode are connected each other.

8. A vibrating gyroscope according to claim 7, wherein said driving means includes an oscillation circuit whose one output terminal is connected to said one first divided electrode and said one second divided electrode, and another output terminal is connected to said common electrode, and said detecting means includes a differential amplifier circuit whose two input terminals are respectively connected to said one first divided electrode and said one second divided electrode.

9. A vibrating gyroscope comprising:

a first piezoelectric base plate polarized in a direction of thickness;

a second piezoelectric base plate laminated on said first piezoelectric base plate, and polarized in the same direction as the polarizing direction of said first piezoelectric base plate;

two first divided electrodes formed on a main surface of said first piezoelectric base plate;

two second divided electrodes formed on a main surface of said second piezoelectric base plate;

a common electrode formed between said first piezoelectric base plate and said second piezoelectric base plate;

a driving means for applying a driving signal between said two first divided electrodes, said two second divided electrodes and said common electrode; and a detecting means for detecting a signal generated between one first divided electrode, one second divided electrode, the other first divided electrode and the other second divided electrode.

10. A vibrating gyroscope according to claim 9, wherein said driving means includes an oscillation circuit whose one output terminal is connected to said two first divided electrodes and said two second divided electrodes, and another output terminal is connected to said common electrode, and said detecting means includes a differential amplifier circuit whose one input terminal is connected to said one first divided electrode and said one second divided electrode, and another input terminal is connected to said other first divided electrode and said other second divided electrode.

* * * * *